United States Patent [19]

Ogawa et al.

[11] Patent Number: 4,568,402
[45] Date of Patent: Feb. 4, 1986

[54] METHOD OF SEALING OPEN ENDS OF CERAMIC HONEYCOMB STRUCTURAL BODY

[75] Inventors: Yutaka Ogawa; Shunichi Yamada, both of Nagoya; Toshiyuki Hamanaka, Suzuka, all of Japan

[73] Assignee: NGK Insulators, Ltd., Japan

[21] Appl. No.: 482,476

[22] Filed: Apr. 6, 1983

[30] Foreign Application Priority Data

Sep. 20, 1982 [JP] Japan ................................. 57-163513

[51] Int. Cl.[4] ........................ C03B 29/00; C04B 33/34
[52] U.S. Cl. ...................................... 156/89; 501/119
[58] Field of Search ................... 156/89, 253; 501/119

[56] References Cited

U.S. PATENT DOCUMENTS

| 3,885,977 | 5/1975 | Lachman et al. | 501/119 |
| 4,280,845 | 7/1981 | Matsuhisa | 264/66 |
| 4,293,357 | 10/1981 | Higuchi et al. | 156/253 |
| 4,297,140 | 10/1981 | Paisley | 428/116 |
| 4,340,403 | 7/1982 | Higuchi et al. | 428/117 |

Primary Examiner—Jay H. Woo
Assistant Examiner—Timothy W. Heitbrink

[57] ABSTRACT

The disclosed method seals preselected open ends of channels of a ceramic honeycomb structural body with cordierite-forming sealing material batch, and fires the honeycomb structural body with the thus sealed ends, so as to convert the sealing material batch into cordierite.

11 Claims, 4 Drawing Figures

METHOD OF SEALING OPEN ENDS OF CERAMIC HONEYCOMB STRUCTURAL BODY

BACKGROUND OF THE INVENTION

1. Field of the Invention

This invention relates to a method of sealing open ends of channels of a ceramic honeycomb structural body which is used for purifying harmful gases such as automobile exhaust gas or industrial-plant exhaust gas, and more particularly the invention relates to a method of sealing open ends of channels of a ceramic honeycomb structural body which forms a heat exchanger or a ceramic filter for removing particulates from automobile exhaust gas or a ceramic honeycomb structural body for supporting catalysts.

2. Description of the Prior Art

Recently, ceramic honeycomb structural bodies have been used as catalyst carriers for purifying automobile exhaust gas or as heat exchangers, and much attention has been paid to various advantages of such ceramic honeycomb structural bodies; namely, that pressure loss of gas flow therethrough is low because a large number of substantially straight and parallel channels are uniformly distributed in the ceramic honeycomb structural body. Additionally, the surface area per unit volume is large, and the ceramic honeycomb structural body can be heated up to a high temperature by using only a small amount of heat energy because the channels thereof are surrounded by thin walls.

For instance, it is known to make a ceramic honeycomb filter by taking advantage of the fact that the ceramic honeycomb structural body has a large surface area per unit volume and that the partition walls or inside walls of the ceramic honeycomb structural body defining a large number of channels therein are porous and very thin. More specifically, certain channels of the ceramic honeycomb structural body are sealed by suitable sealing material at one end thereof, while the remaining unsealed channels of the ceramic honeycomb structural body are subsequently sealed by a suitable sealing material at the opposite ends thereof. Hence, the partition walls form filtering layers for providing a large filtering area per unit volume of the ceramic filter while ensuring a low pressure therethrough. In such a filter, the thin porous partition walls capture particulates from the exhaust gas passing therethrough, thereby acting as an effective filtration system. Accordingly, the sealing material which seals the end openings of the channels of such ceramic honeycomb filter is required to be tightly bonded to the peripheral walls and partition walls so as to perfect sealing without any leakage of the dust-containing gas. Thus, reliable sealing of the open ends of the ceramic honeycomb structural body channels is a very important point in producing the ceramic honeycomb filter. When the ceramic honeycomb structural body is used as a carrier of catalysts, open ends of the channels in the proximity of the outer peripheral wall of the honeycomb structural body are sometimes sealed by a suitable sealing material for the purpose of improving the mechanical strength thereof, and the sealing material of such catalyst-supporting ceramic honeycomb structural body is also required to be tightly bonded to the partition walls of the honeycomb structural body.

As to the sealing material for sealing open ends of channels of a ceramic honeycomb structural body for the purpose of producing a ceramic honeycomb filter, U.S. Pat. No. 4,297,140 discloses manganese-cordierite system sealing material which is melted and foamed in the process of firing so as to seal the channels of the ceramic honeycomb structural body. Japanese patent application Laid-open Specification No. 42316/82 discloses the sealing of channels of a ceramic honeycomb structural body by fitting and bonding of suitable sealing material in the channels substantially without liquid-phase reaction, wherein the difference of the coefficients of thermal expansion between the honeycomb structural body and the sealant must be within a certain limited range and the sealing material is bonded substantially without liquid-phase reaction during firing. Furthermore, Japanese patent application Laid-open Specification No. 42317/82 discloses using alumina cement as a sealing material, whose heat-resistance is improved by using a specified concentration range of calcium oxide (CaO).

It should be noted that sealing by melting and foaming of a manganese-cordierite system sealing material during firing can provide tight sealing of the channels of the honeycomb structural body because of the comparatively low thermal expansion of the sealing material and the bonding, under vitrified molten condition, of the sealing material. However, the presence of manganese in the sealing material as a fusing-aid agent results in a very low melting point of about 1,200° C., such that the sealing material has an insufficient heat-resistance for use as a sealant in a ceramic honeycomb filter which will be exposed to high temperature carbonous particulates captured by the honeycomb filter. If the content of the fusing-aid agent is limited to improve the heat-resistance, the increased melting and vitrification temperature of 1,300° C., or higher, results in diffusion of the sealing material into the partition walls of the channels at the time of sealing the channels of a cordierite body.

When the sealing material is placed in, and bonded to the channels of the honeycomb structural body, substantially without liquid-phase reaction, (although a ceramic honeycomb filter with a good thermal shock resistance can be produced because of the small difference in thermal expansion between the sealant and the honeycomb structural body) there is a shortcoming in that the tightness of the sealing of channels is insufficient because of the firing shrinkage of the sealing material during solid phase reactions thereof. Hence, the firing tends to cause gaps between the sealant and the partition walls of the honeycomb structural body channels.

Many studies have been carried out on low-thermal-expansion cordierite compositions ($2MgO \cdot 2Al_2O_3 \cdot 5SiO_2$), and as a result, a low thermal expansion cordierite composition with a coefficient of thermal expansion of not more than $11.0 \times 10^{-7}$/°C., between 25°–1,000° C., has been obtained near the the theoretical cordierite composition (51.3% of $SiO_2$, 34.9% of $Al_2O_3$, 13.8% of MgO); more particularly, in the range of chemical composition consisting of 43–52% of $SiO_2$, 33–39% of $Al_2O_3$ and 12–18% of MgO. Such low thermal expansion cordierite is produced by carefully reducing impurities in the raw material batch, properly utilizing the orientation of the kaolin material, and prudently checking the raw materials such as the magnesia source. On the other hand, as to the reduction of firing shrinkage, which is necessary to effectuate the sealing of the channels in the honeycomb body, addition of other fusing agents or foaming agents is known. However, until now, there has not been any cordierite material batch composition suitable for sealing the open ends of channels in a low thermal expansion ceramic honeycomb structural body, wherein the material has a low intrinsic firing shrinkage and a finite value of volumetric expansion.

SUMMARY OF THE INVENTION

Therefore, an object of the present invention is to obviate the above-mentioned shortcomings of the prior art and provide an improved method of sealing open ends of channel of a ceramic honeycomb structural body.

Another object of the invention is to provide a method of forming reliable and very tight seals at selected positions in open ends of channels of a ceramic honeycomb structural body, by using a low thermal expansion sealing material having an excellent heat-resistance.

In a preferred embodiment of the invention, predetermined open ended in channels of a ceramic honeycomb structural body are sealed by using a cordierite-forming material batch, and the thus sealed honeycomb structural body is fired at a temperature above 1,300° C., to convert the above-mentioned cordierite-forming material batch into cordierite. The cordierite-forming material batch contains ingredients selected from the group consisting of a combination of not less than 10 parts by weight of α-alumina and not less than 10 parts by weight of calcined talc, a combination of not less than 15 parts by weight of α-alumina and not less than 5.5 parts by weight of either quartz or amorphous silica, and not less than 7 parts by weight of mullite.

BRIEF DESCRIPTION OF THE DRAWINGS

For a better understanding of the invention, reference is made to the accompanying drawings, in which.

Figure 1:
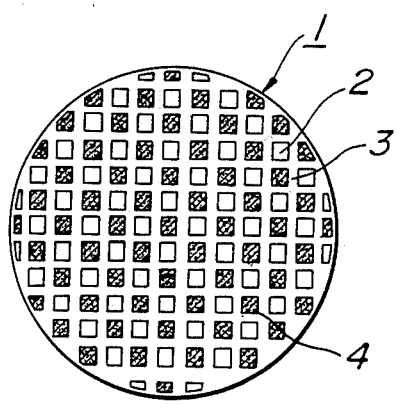
FIG. 1 is an end view of a ceramic honeycomb filter.
Figure 2:
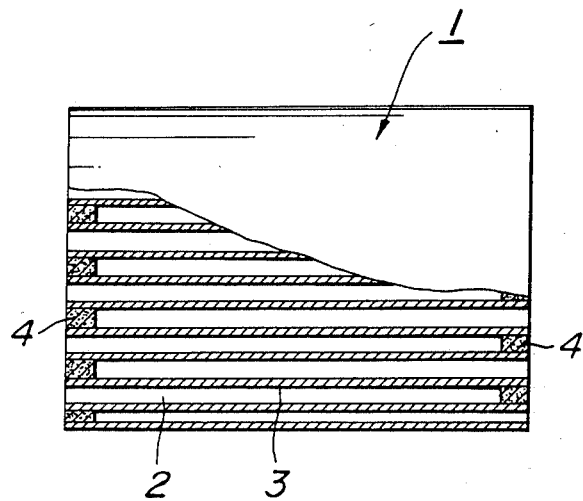
FIG. 2 is a partially cutaway side view of the ceramic honeycomb filter of FIG. 1.

Throughout different views of the drawing, the numeral 1 is a ceramic honeycomb structural body, the numeral 2 is a throughhole or channel, the numeral 3 is a porous partition, and the numeral 4 and the numeral 4' are sealing members of the channels.

DESCRIPTION OF THE PREFERRED EMBODIMENTS

Figure 3:
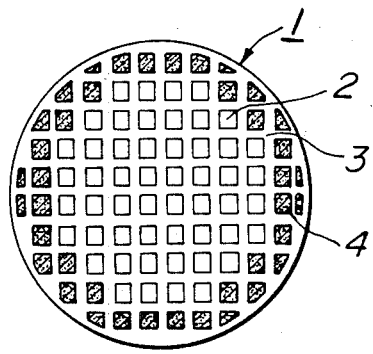
FIG. 3 is an end view of a ceramic honeycomb structural body having peripheral portions thereof reinforced.
Figure 4:
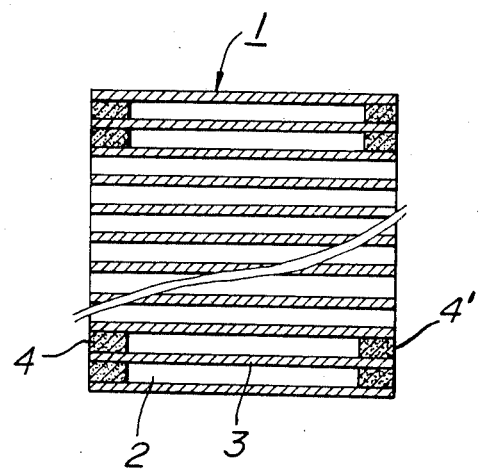
FIG. 4 is a longitudinal sectional view of the ceramic honeycomb structural body of FIG. 3.

Referring to FIG. 1, a ceramic honeycomb structural body 1 has a plurality of channels 2 defined by thin porous partition walls 3, and some of the channels 2 have one side open ends thereof plugged by sealing members 4 while the remainder of the channels 2 have the opposite open ends thereof plugged by similar sealing members 4', so as to produce a ceramic honeycomb filter with filtering layers formed of the porous partition walls. The thus produced ceramic honeycomb filter has a large filtering area per unit volume thereof and a low pressure loss therethrough. When a high mechanical strength for the ceramic honeycomb structural body is required, open ends of the channels 2 in the proximity of the outer peripheral wall of the honeycomb structural body 1 are sealed at opposite ends thereof, as shown in FIGS. 3 and 4. In any case, tight bonding between the sealing members 4 and 4' and the partition walls 3 of the honeycomb structural body 1 is of prime importance for satisfactory performance of the ceramic honeycomb filter or catalyst-supporting ceramic honeycomb structural body.

To ensure tight bonding, it is very important that the firing shrinkage of ceramic material batch forming the sealing member 4 or 4' is small. After a series of studies, the inventors have found that the use of those cordierite-forming materials in the batch for the sealing member which have a poor reactivity at the temperatures for firing of the sealing members is effective in reducing the firing shrinkage of the sealing members. Examples of such cordierite-forming materials are α-alumina, calcined talc, calcined kaolin, quartz or amorphous silica, mullite, pyrophyllite, calcined pyrophyllite, kyanite, calcined kyanite, periclase, calcined bauxite, and the like. The reason for the reduction of the firing shrinkage by the use of the above-mentioned materials is in that they act to suppress the shrinkage caused at comparatively low temperatures by dehydration, change of crystal structure, and decomposition of other materials co-acting with the above-mentioned materials in producing cordierite, such as aluminum hydroxide, low clay, talc, or the like materials. The cordierite-forming reaction proceeds rapidly at 1,200° C. or higher, especially at 1,300° C. or higher, resulting in a large volumetric expansion thereof. Besides, the cordierite-forming reaction includes a liquidus phase with a very high viscosity, so that the above-mentioned volumetric expansion does not cause any breakage of the partition walls of the channels at the sealing portions, and very tight bonding and sealing occur in the sealing member and at the joint between the sealing member and the partition walls of the honeycomb structural body channels. Thus, the volumetric expansion in the firing process is very effective in producing the desired sealing of the honeycomb structural body channels.

Among the above-mentioned cordierite-forming materials, the calcined materials have a reactivity which is highly sensitive to the calcining temperature. For instance, the use of current calcined kaoline, such as GLOMAX-LL (trademark of GEORGIA KAOLIN COMPANY), does not render any noticeable reduction of the firing shrinkage. Only after calcination at a temperature high enough for sufficient conversion into mullite, can the calcined kaolin produce the desired effects of reducing the firing shrinkage.

The reason why the sealing material batch of the invention contains a combination of α-alumina and calcined talc, a combination of α-alumina and either one of quartz and amorphous silica, and mullite at concentrations in excess of the above-mentioned minimum values is in that if the concentrations of such materials are less than the above-mentioned minimum values, the desired reduction in the firing shrinkage of sealing material batches to a value below zero cannot be achieved. Therefore, the desired tight sealing of the channels of the honeycomb member cannot occur, as will be illustrated by the Examples to be described hereinafter. Of the selected materials, the calcined talc has the starting talc thereof completely converted into protoenstatite and therefore contains no residual talc, as revealed by X-ray diffraction thereof. Mullite can contain synthesized mullite material, after calcining at a temperature high enough for thorough conversion of kaolin into mullite, e.g., at 1,200° C. or higher, while adjusting the concentration thereof in a suitable manner. The reason why the concentrations of the above-mentioned materials have no upper limits in the method of the invention, is that the concentration of ternary $SiO_2$-$Al_2O_3$-$MgO$ system for providing a low thermal expansion is restricted to the narrow range close to the theoretical composition of cordierite ($2MgO.2Al_2O_3.5SiO_2$). More specifically, in the case of talc-kaolin-alumina system compositions, which are commonly used as low thermal expansion material batch of cordierite composition, there are limits of concentrations of individual ingredients thereof, i.e., $SiO_2$ materials such as quartz and amorphous silica, $Al_2O_3$ materials such as α-alumina, $SiO_2$-$MgO$ materials such as calcined talc and $SiO_2$-$Al_2O_3$ materials such as mullite.

The coefficient of thermal expansion of the sealant batch is a very important factor when the ceramic honeycomb structural body is required to have a high thermal shock resistance. When the sealing material batches for sealing open ends of channels of cordierite honeycomb structural bodies are exposed to automobile exhaust gasses and when the similar sealing material batches are used for cordierite honeycomb filters, it is preferable that the coefficient of thermal expansion of the sealing material batch should not exceed that of the cordierite honeycomb structural body or should not exceed $2.0\times10^{-6}/°C.$, in a temperature range from a somewhat high room temperature to 800° C. This is a necessary requirement because any coefficients of thermal expansion of the sealing material batch in excess of the above-mentioned limit, seriously deteriorates the thermal shock resistance of the honeycomb structural bodies and the honeycomb filters. The magnitude of the coefficient of thermal expansion of the sealing material batches depends on various factors, such as the firing conditions, the concentrations of poor-reactivity materials in the sealing material batch like those of α-alumina, quartz, mullite, calcined talc, and the like, and the chemical composition of the sealing material batch. It is noted that the firing shrinkage of the sealing material batches is not so seriously affected by the chemical composition thereof, provided that the chemical composition falls in the range of the known low-thermal-expansion compositions of cordierite. In short, it is preferable to control the coefficient of thermal expansion of the sealing material batch below $2.0\times10^{-6}/°C.$ for a temperature range from room temperature to 800° C. by selecting proper firing conditions and proper concentrations of poor-reactivity materials in the sealing material batch in the low thermal expansion composition range of cordierite.

When the cordierite-forming material batch is fired at 1,300° C. or higher, the resultant crystal composition contains, in addition to cordierite, other crystal phases such as mullite, spinel, sapphirine, corundum, and the like. Since such other crystal phases improve the heat-resistance of the sealing member after firing, the sealing material batch should preferably contain less than 30% by weight of such other crystal phases. The reason for limiting the concentration such other crystal phases to less than 30% by weight is in that the presence of said crystal phases in excess of 30% by weight results in a coefficient of thermal expansion which is larger than $2.0\times10^{-6}/°C.$, so as to deteriorate the thermal shock resistance of the sealing member.

The grain size of the sealing material batch of the invention is preferably smaller than 74 μm for all the ingredients thereof, but a larger grain size can also be sufficient, depending on the firing conditions therefor.

As to the material of the honeycomb structural body to be sealed by the method of the present invention, cordierite is most preferable from the standpoint of thermal-shock-resistance, because the sealing material batches of the invention are converted into cordierite upon firing. However, the material of the honeycomb structural body is not restricted to cordierite, but any other materials which withstand temperatures higher than the firing temperature of the sealing material batches can be used for the honeycomb structural body as far as the process of sealing the open ends of the channels thereof is concerned. For instance, the method of the invention can be applied to honeycomb structural bodies made of mullite, zircon-mullite, alumina, silicon carbide, silicon nitride, zirconia, and the like, depending on the intended use of the honeycomb structural bodies.

The process of sealing the open ends of the channels of a honeycomb structural body will be described now. For instance, one or both ends of the honeycomb structural body are closed by applying tape thereto, and holes are bored at those positions of the tape which correspond to the desired open ends of the channels to be sealed. The sealing material batch is pressed into the desired open ends under pressure, as disclosed by U.S. Pat. No. 4,293,357. Instead of using the tape, the sealing material batch can be directly applied to the desired open ends of the channels of the honeycomb structural body by using a syringe with a thin needle insertible into the desired open ends of the throughholes. The sealing material batch thus applied to the open ends of the channels is dried, and if any gaps or other irregularities are caused at the open ends being sealed by the drying, such gaps or irregularities are repaired by reapplying the sealing material batch thereto. The drying may be effected by using a high-frequency induction heating at 100°-150° C. for a short period of time, or natural drying may be used provided that the sealing material batch is dried in a satisfactory manner. The honeycomb structural body with the sealing material batch applied thereto and dried is then fired at 1,300°-1,450° C., more preferably at 1,350°-1,430° C., i.e., at a popular firing temperature of cordierite. When the firing is effected at a comparatively low temperature in the proximity of 1,300° C., the firing temperature must be held for a comparatively long time to achieve the desired low thermal expansion. However, if the firing temperature is approximately 1,400° C., it is sufficient to hold such firing temperature for only a few hours. When the sealing material batch has a large amount of poor-reactivity ingredients, the firing must be effected at a high temperature for a long period of time as a matter of course.

EXAMPLES

A number of cordierite honeycomb structural bodies, each of which had an outside diameter of 118 mm, a length of 152 mm, and channels defined by 0.43 mm thick partition walls at a rate of 16 holes per square centimeter, were prepared as honeycomb structural bodies for cordierite honeycomb filters by unitary extrusion, drying, and heating at 1,420° C. for 2 hours.

To seal the open ends of the channels of the cordierite honeycomb structural bodies, Samples Nos. 1-22 of cordierite-forming sealing material batches were prepared as shown in Table 1A. Each of the samples was prepared by adding 2 kg of each batch in a solution consisting of 20 g of methyl cellulose, 185 g of glycerin, and 600 g of water, and thoroughly kneading the mixture thus formed so as to produce paste-like sealing material batch. A cylindrical syringe having a piston and a nozzle with a 1.5 mm diameter was used to insert sealing material batch to each of the open ends of a 15-25 mm deep channels to be sealed. Some of the channels of the honeycomb structural body were sealed at one end of the honeycomb structural body so as to form a checker-flag pattern of sealing members thereon, while the remainder of the channels were similarly sealed at the opposite end of the honeycomb structural body so as to form a similar a checker-flag pattern of sealing member thereon. Each of the cordierite honeycomb structural bodies having the open ends thereof sealed by the cordierite-forming material sealant batches of Table 1A was dried at 150° C. for 2 hours, and after the sealing at both ends was checked, each honeycomb structural body was fired by holding at a firing temperature with a maximum at 1,400° C. for 6 hours, to convert the sealing material batch into cordierite for completely sealing the open ends of the channels of the honeycomb structural body.

Properties of each of the sealing material batches, i.e., the coefficient of thermal expansion, crystal composition, and firing shrinkage, were determined by preparing a cylindrical test piece having a diameter of 20 mm and a length of 50 mm from each of the above-mentioned paste-like sealing material batches, which test piece was dried and fired at the firing temperature with a maximum at 1,400° C. for 6 hours, and by taking measurement on the test piece thus prepared. The result of the measurement are shown in Table 1B.

TABLE 1A

| Material batch No. | Chemical composition (% by weight) (in terms of three components) | | | Receipt of ingredients (% by weight) | | | | | | | | | |
|---|---|---|---|---|---|---|---|---|---|---|---|---|---|
| | $SiO_2$ | $Al_2O_3$ | MgO | Talc | Calcined talc | Kaolin | Calcined kaolin | Alumina | Aluminum hydroxide | Quartz | Amorphous silica | Mullite | (Total) |
| 1 | 49.3 | 36.9 | 13.8 | — | 38.2 | 20.0 | 21.8 | 10.5 | 9.5 | — | — | — | (100.0) |
| 2 | 50.6 | 35.9 | 13.5 | 15.0 | 24.0 | 20.0 | 26.5 | 14.5 | — | — | — | — | (100.0) |
| 3 | 49.9 | 36.3 | 13.8 | 20.1 | 20.0 | 20.0 | 23.9 | 16.0 | — | — | — | — | (100.0) |
| 4 | 50.1 | 35.6 | 14.3 | 20.1 | 20.0 | 15.0 | 25.4 | 8.0 | 11.5 | — | — | — | (100.0) |
| 5 | 50.5 | 35.8 | 13.7 | 30.2 | 10.0 | 15.0 | 29.9 | 14.9 | — | — | — | — | (100.0) |
| 6 | 50.2 | 35.7 | 14.1 | 30.2 | 10.0 | 15.0 | 26.8 | 10.0 | 8.0 | — | — | — | (100.0) |
| 7 | 50.7 | 35.6 | 13.7 | 32.2 | 8.0 | 15.0 | 30.4 | 14.4 | — | — | — | — | (100.0) |
| 8 | 50.4 | 36.0 | 13.6 | 40.4 | — | 15.0 | 29.6 | 15.0 | — | — | — | — | (100.0) |
| 9 | 50.5 | 35.9 | 13.6 | 41.0 | — | 10.7 | — | 30.2 | — | 18.1 | — | — | (100.0) |
| 10 | 50.8 | 35.7 | 13.5 | 40.7 | — | 10.5 | 6.8 | 27.0 | — | 15.0 | — | — | (100.0) |
| 11 | 50.9 | 35.4 | 13.7 | 41.0 | — | 10.0 | 22.0 | 20.0 | — | 7.0 | — | — | (100.0) |
| 12 | 49.8 | 36.9 | 13.3 | 29.6 | 10.0 | 10.5 | 22.4 | 21.3 | — | 6.2 | — | — | (100.0) |
| 13 | 50.7 | 36.3 | 13.0 | 38.9 | — | 10.0 | 29.0 | 17.8 | — | 4.3 | — | — | (100.0) |
| 14 | 50.9 | 35.3 | 13.8 | 39.1 | — | 25.3 | — | 15.0 | 10.6 | 10.0 | — | — | (100.0) |
| 15 | 51.0 | 35.2 | 13.8 | 39.1 | — | 25.3 | — | 15.0 | 10.6 | — | 10.0 | — | (100.0) |
| 16 | 50.5 | 35.8 | 13.7 | 40.1 | — | 10.0 | 22.9 | 15.0 | 6.5 | 5.5 | — | — | (100.0) |
| 17 | 51.3 | 35.8 | 13.7 | 40.1 | — | 10.0 | 15.2 | 13.8 | 11.6 | 10.0 | — | — | (100.0) |
| 18 | 49.9 | 35.9 | 14.2 | 40.0 | — | 20.0 | 10.4 | — | 9.6 | — | — | 20.0 | (100.0) |
| 19 | 49.2 | 37.0 | 13.8 | 19.8 | 20.0 | 15.0 | 21.7 | 10.0 | 3.5 | — | — | 10.0 | (100.0) |
| 20 | 50.0 | 36.1 | 13.9 | 20.0 | 20.0 | 15.0 | 24.3 | 9.8 | 3.9 | — | — | 7.0 | (100.0) |
| 21 | 50.4 | 35.6 | 14.0 | 20.1 | 20.0 | 15.0 | 25.7 | 9.7 | 4.5 | — | — | 5.0 | (100.0) |
| 22 | 49.8 | 36.4 | 13.8 | 40.1 | — | 15.0 | 23.9 | 9.7 | 4.3 | — | — | 7.0 | (100.0) |

TABLE 1B

| Material batch No. | Characteristics of test pieces fired at 1,400° C. for 6 hours* | | | | | | Light leak from sealed end of honeycomb structural body** |
|---|---|---|---|---|---|---|---|
| | Crystal composition (% by weight) | | | | Radial firing shrinkage (%) | Coefficient of thermal expansion, 40-800° C., × $10^{-6}$/°C. | |
| | Cordierite | Mullite | Spinel, Sapphirine | Corundum | | | |
| 1 | 75.0 | 4.9 | 2.5 | — | −1.9 | 1.82 | None |
| 2 | 84.1 | 3.8 | 1.9 | — | −1.4 | 1.80 | None |
| 3 | 86.0 | 3.8 | 1.9 | — | −1.2 | 1.71 | None |
| 4 | 89.2 | 2.7 | 2.5 | — | +0.6 | 1.57 | Some |
| 5 | 87.2 | 2.8 | 1.8 | — | −0.2 | 1.54 | None |
| 6 | 84.7 | 3.2 | 2.1 | — | 0.0 | 1.63 | None |
| 7 | 89.3 | 2.5 | 1.9 | — | +0.8 | 1.65 | Some |
| 8 | 90.1 | 2.9 | 1.8 | — | +1.2 | 1.48 | Some |
| 9 | 72.3 | 6.1 | 7.9 | 1.3 | −2.5 | 1.98 | None |
| 10 | 78.8 | 4.5 | 5.1 | 0.8 | −2.2 | 1.85 | None |
| 11 | 80.9 | 3.7 | 4.2 | 0.2 | −0.9 | 1.72 | None |
| 12 | 81.1 | 4.3 | 4.4 | — | −0.5 | 1.70 | None |
| 13 | 84.3 | 5.1 | 3.1 | — | +0.4 | 1.60 | Some |
| 14 | 86.9 | 3.9 | 4.5 | 0.2 | −1.0 | 1.65 | None |
| 15 | 87.2 | 3.8 | 4.5 | 0.2 | −1.1 | 1.63 | None |
| 16 | 88.7 | 2.9 | 3.0 | — | 0.0 | 1.58 | None |
| 17 | 82.0 | 3.7 | 4.4 | — | +0.3 | 1.78 | Some |
| 18 | 71.3 | 8.9 | 2.7 | — | −2.4 | 1.98 | None |
| 19 | 75.0 | 7.0 | 2.1 | — | −1.8 | 1.80 | None |
| 20 | 77.9 | 6.8 | 2.0 | — | −0.4 | 1.75 | None |
| 21 | 80.3 | 6.6 | 2.5 | — | +0.2 | 1.70 | Some |

TABLE 1B-continued

| Material batch No. | Characteristics of test pieces fired at 1,400° C. for 6 hours* | | | | Radial firing shrinkage (%) | Coefficient of thermal expansion, 40-800° C., × 10⁻⁶/°C. | Light leak from sealed end of honeycomb structural body** |
|---|---|---|---|---|---|---|---|
| | Crystal composition (% by weight) | | | | | | |
| | Cordierite | Mullite | Spinel, Sapphirine | Corundum | | | |
| 22 | 78.4 | 6.7 | 2.0 | — | 0.0 | 1.71 | None |

NOTES:
*Test piece with a diameter of 20 mm and a length of 50 mm.
**Cordierite honeycomb structural body with a diameter of 118 mm and a length of 152 mm.

The sealed conditions of the cordierite honeycomb structural bodies thus prepared was checked by applying light beams to the channels of the honeycomb structural body, in parallel with the channels, and examining whether the light beams shown through or not. The result of the light leak check is also shown in Table 1B.

As described in detail in the foregoing by referring to the various Examples, with the method of sealing the open ends of ceramic honeycomb structural body channels according to the present invention, very tight and highly reliable sealing of the open ends of the ceramic honeycomb structural body channels can be obtained, as compared with conventional methods. The method of the invention facilitates production of cordierite honeycomb filters and catalyst-carrying ceramic honeycomb structural bodies having very tightly sealed channels and renders an outstanding highly reliable thermal shock resistant filter. Thus, the method of the invention is very useful not only in the art of removing particulates from exhaust gas of internal combustion engines such as Diesel engines, but also in many other industrial fields requiring strong and reliable ceramic honeycomb structural bodies.

What is claimed is:

1. A method of sealing open ends of channels of a ceramic honeycomb structural body, comprising the steps of applying a cordierite-forming sealing material batch to selected open ends of channels of a ceramic honeycomb structural body, ingredients of said sealing material batch containing a combination of materials selected from the group of combinations consisting of a combination of 10-16% by weight of α-alumina, 10-38.2% by weight of calcined talc and 80-45.8% by weight of oxides which form cordierite, a combination of 15-30.2% by weight of α-alumina, 5.5-18.1% by weight of quartz and 79.5-51.7% by weight of oxides which form cordierite, and a combination of 15% by weight of α-alumina, 10% by weight of amorphous silica and 75% by weight of oxides which form cordierite, and firing the ceramic honeycomb structural body with the sealing material batch thus applied thereto at a temperature not lower than 1,300° C. so as to convert the cordierite-forming sealing material batch into cordierite having a coefficient of thermal expansion of less than $2.0 \times 10^{-6}$/°C. through a temperature range of room temperature to 800° C., said sealing material not shrinking, or actually expanding upon firing.

2. A method of sealing open ends of channels of a ceramic honeycomb structural body, comprising the steps of applying a cordierite-forming sealing material batch to selected open ends of channels of a ceramic honeycomb structural body, ingredients of said sealing material batch consisting of 7-20% by weight of mullite and 93-80% by weight of oxides which form cordierite, and firing the ceramic honeycomb structural body with the sealing material batch thus applied thereto at a temperature not lower than 1,300° C. so as to convert the cordierite-forming sealing material batch into cordierite having a coefficient of thermal expansion of less than $2.0 \times 10^{-6}$/°C. through a temperature range of room temperature to 800° C., said sealing material not shrinking, or actually expanding upon firing.

3. The method of claim 1, wherein some of the channels of the ceramic honeycomb structural body are sealed at one end of the honeycomb structural body, while the remainder of the channels of the ceramic honeycomb structural body are sealed at the opposite end of the ceramic honeycomb structural body.

4. The method of claim 1, wherein a plurality of the channels of the ceramic honeycomb structural body located near an outer peripheral portion thereof are sealed adjacent at least one end of the ceramic honeycomb structural body.

5. The method of claim 1, wherein said ceramic honeycomb structural body is made of cordierite.

6. The method of claim 3, wherein said ceramic honeycomb structural body is made of cordierite.

7. The method of claim 4, wherein said ceramic honeycomb structural body is made of cordierite.

8. The method of claim 2, wherein a crystal phase of said sealing material batch, after being converted into cordierite, consists essentially of cordierite and contains less than 30% by weight of crystals of at least one compound selected from the group consisting of spinel, sapphirine, mullite, and corundum.

9. The method of claim 3, wherein a crystal phase of said sealing material batch, after being converted into cordierite, consists essentially of cordierite and contains less than 30% by weight of crystals of at least one compound selected from the group consisting of spinel, sapphirine, mullite, and corundum.

10. The method of claim 4, wherein a crystal phase of said sealing material batch, after being converted into cordierite, consists essentially of cordierite and contains less than 30% by weight of crystals of at least one compound selected from the group consisting of spinel, sapphirine, mullite, and corundum.

11. A method of sealing open ends of channels of a ceramic honeycomb structural body, comprising the steps of applying a cordierite-forming sealing material batch to selected open ends of channels of a ceramic honeycomb structural body, ingredients of said sealing material batch containing a combination of materials selected from the group of combinations consisting of a combination of 10-16% by weight of α-alumina, 10-38.2% by weight of calcined talc and 80-45.8% by weight of oxides which form cordierite, a combination of 15-30.2% by weight of α-alumina, 5.5-18.1% by weight of quartz and 79.5-51.7% by weight of oxides which form cordierite, and a combination of 15% by weight of α-alumina, 10% by weight of amorphous silica and 75% by weight of oxides which form cordierite, and firing the ceramic honeycomb structural body with the sealing material batch thus applied thereto at a temperature not lower than 1,300° C. so as to convert the cordierite-forming sealing material batch into cordierite having a coefficient of thermal expansion of less than $2.0 \times 10^{-6}$/°C. through a temperature range of room temperature to 800° C. and containing less than 30% by weight of crystals of at least one compound selected from the group consisting of spinel, sapphirine, mullite and corundum, said sealing material not shrinking, or actually expanding upon firing.

* * * * *